(12) United States Patent
Kuroda et al.

(10) Patent No.: US 7,886,366 B2
(45) Date of Patent: Feb. 8, 2011

(54) CANTILEVER DEVICE AND CANTILEVER CONTROLLING METHOD

(75) Inventors: Masaharu Kuroda, Tsukuba-mirai (JP);
Kentaro Nishimura, Hachiohji (JP);
Takashi Someya, Tsukuba (JP); Hiroshi Yabuno, Shinagawa-ku (JP)

(73) Assignees: National Institute of Advanced Industrial Science and Technology, Tokyo (JP); University of Tsukuba, Ibaraki (JP)

( * ) Notice: Subject to any disclaimer, the term of this patent is extended or adjusted under 35 U.S.C. 154(b) by 194 days.

(21) Appl. No.: 12/274,511

(22) Filed: Nov. 20, 2008

(65) Prior Publication Data
US 2009/0293161 A1 Nov. 26, 2009

(30) Foreign Application Priority Data
May 23, 2008 (JP) ............................ 2008-135738

(51) Int. Cl.
*G01Q 60/24* (2010.01)
*G01Q 30/06* (2010.01)
(52) U.S. Cl. ........................... 850/33; 850/11; 977/863; 702/56
(58) Field of Classification Search .................. 850/11, 850/23, 33; 324/327, 762; 702/56; 73/105, 73/504.15
See application file for complete search history.

(56) References Cited

U.S. PATENT DOCUMENTS
7,570,061 B2 * 8/2009 Kuroda et al. ............... 324/327

FOREIGN PATENT DOCUMENTS
JP 2006208089 8/2006

OTHER PUBLICATIONS

"Frequency Modulation detection using high-Q cantilevers for enhanced force microscope sensitivity." T.R. Albrecht et al., Journal of Applied Physics vol. 69 (1991), pp. 668-673. (San Jose, California).
"Self-oscillation technique for AFM in liquids." T. Okajima et al., Applied Surface Science, vol. 210 (2003), pp. 68-72. (Japan).
"Control of van der Pol type cantilever by using integral controller." Hiroshi Yabuno, et al., lectured on Nov. 24, and 25, 2007. (Japan).

* cited by examiner

*Primary Examiner*—Jack I Berman
*Assistant Examiner*—Meenakshi S Sahu
(74) *Attorney, Agent, or Firm*—Young Basile

(57) ABSTRACT

The amplitude control of a cantilever based on the van der Pol model is performed through feedback using measurement data on a deflection of the cantilever. A self-oscillating circuit integrates a deflection angle signal of a cantilever detected by a deflection angle measuring mechanism using an integrator, multiplies a resulting integral value by linear feedback gain generated by a gain generator, and an output corresponding to the linear feedback signal is generated. Also, the self-oscillating circuit cubes the deflection angle signal using analog multipliers, integrates the resulting values using integrators, multiplies the resulting integral values by a nonlinear feedback gain generated by a gain generator, and an output corresponding to the nonlinear feedback signal is generated. Furthermore, the self-oscillating circuit adds the outputs together using an adder, and a voltage signal for a piezo element is generated.

8 Claims, 10 Drawing Sheets

FIG. 3
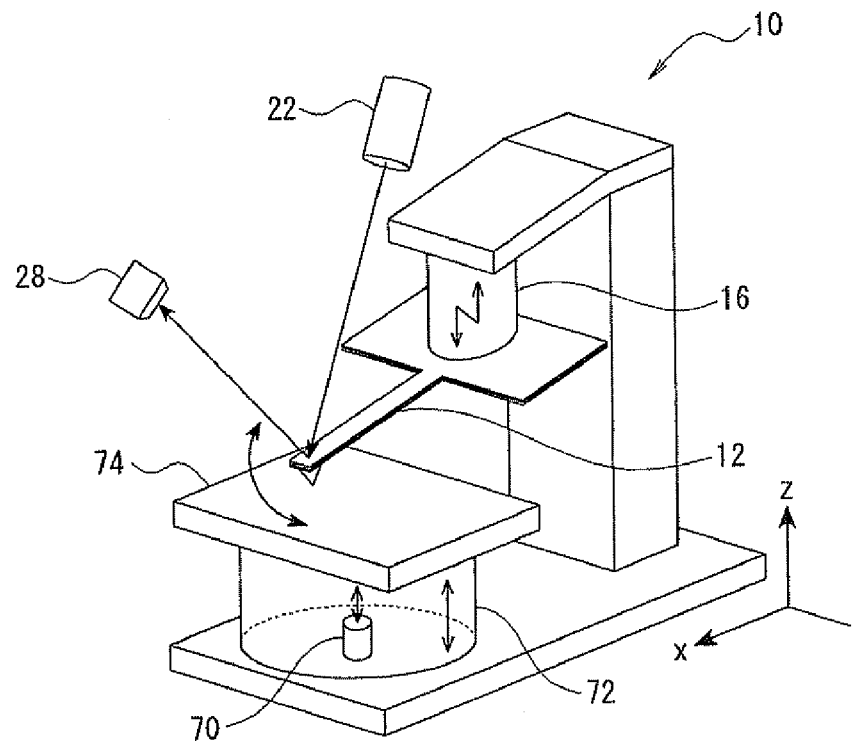
FIG. 4A
FIG. 4B
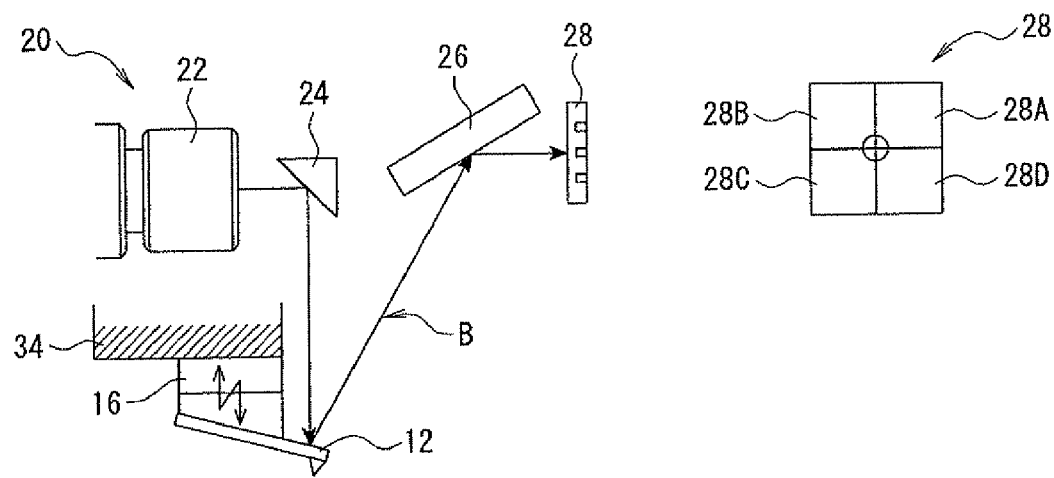

CANTILEVER DEVICE AND CANTILEVER CONTROLLING METHOD

FIELD OF THE INVENTION

The present invention relates to a cantilever device used for an atomic force microscope, which measures surface geometry of a measuring object and to a cantilever controlling method for controlling a cantilever of the cantilever device.

BACKGROUND OF THE INVENTION

Recently, there have been high expectations for observation of biological specimens by an atomic force microscope (AFM). The AFM is a device used to observe surface geometry of a microscopic object using a microcantilever with a probe at its tip. Equivalent natural frequency of the cantilever changes due to atomic forces acting between the specimen and probe. Thus, by detecting changes in the natural frequency of the cantilever and calculating the effect of the atomic forces on the probe from the detected changes, it is possible to measure the distance between the probe and specimen. For example, JP2006-208089A discloses a cantilever control apparatus by nonlinear feedback control of cantilever's self-excited vibration in an atomic force microscope Observation of the real structure of a biological specimen under physiological conditions is one of major goals of submerged AFM observation. However, when an AFM is used in a liquid, since a Q value of the cantilever falls due to viscous damping, a conventional method which uses forced vibration makes observation difficult. To avoid this situation, techniques which use self-oscillation (which is also called self-excited oscillation) have been studied and various techniques have been proposed (refer to the examples, T. R. Albrecht, P. Grutter, and D. Ruger, "Frequency Modulation Detection Using High-Q Cantilevers for Enhanced Force Microscope Sensitivity," Journal of Applied Physics, Vol. 69 (1991), pp. 668-673; and T. Okajima, H. Sekigushi, H. Arakawa, and A. Ikai, "Self-Oscillation Technique for AFM in Liquids," Applied Surface Science, Vol. 210 (2003), pp. 68-72).

At low amplitudes, the frequency of the self-oscillation approximately coincides with the natural frequency, making it possible to measure the natural frequency even in liquids. However, during self-oscillation, increases in amplitude with time are typically unavoidable. Thus, in order to use self-oscillation for measuring the biological specimens which will become deformed even on slight impact, it is necessary to keep the amplitude at a sufficiently low level.

SUMMARY OF THE INVENTION

Thus, the inventors of the present application have proposed the present invention to give the microcantilever vibration characteristics similar to those of a van der Pol self-oscillator using linear feedback and nonlinear feedback, aiming for realizing the low-amplitude and the steady-state oscillation.

That is, because of its nonlinearity, that the steady-state vibration conditions with finite amplitude exists in the van der Pol self-oscillation is a well-known matter. The amplitude characteristics, if used properly, enable amplitude control under resonant conditions of the cantilever, which makes it possible to solve the problem of contact to a measurement specimen.

In view of the above circumstances, an object of the present invention is to provide a cantilever device and a cantilever controlling method which enable amplitude control of a cantilever through the feedback using the measurement data on any of a deflection angle, a deflection, and a displacement of the cantilever.

A cantilever device according to an aspect of the present invention is a cantilever device used for an atomic force microscope which measures surface geometry of a measuring object, comprising: a cantilever equipped with a probe at a tip and capable of vibrating; a vibration source which realizes the cantilever to vibrate in the self-excited mode; a detection mechanism which detects a deflection angle of the cantilever; and a control unit which performs a feedback control of the vibration source based on the deflection angle of the cantilever, wherein a feedback control signal $V_C$ generated by the control unit is given by Equation (9) below:

[Formula 9]

$$V_c = -K_{lin} \int \frac{\partial w}{\partial s} dt \bigg|_{s=x_s} + K_{non} \int \left(\frac{\partial w}{\partial s}\right)^{m+1} dt \bigg|_{s=x_s} \quad (9)$$

where $K_{lin}$ is a linear feedback gain which is positive, $K_{non}$ is a nonlinear feedback gain which is positive, $\partial w/\partial s$ is the deflection angle of the cantilever, $X_s$ is a sensing point for the cantilever, and m is an even number equal to or larger than 2.

Further, this cantilever device according to a variation is characterized in that the feedback control signal $V_C$ generated by the control unit is given by Equation (10) below:

[Formula 10]

$$V_c = -K_{lin} \int \frac{\partial w}{\partial s} dt \bigg|_{s=x_s} + K_{non} \int \left(\frac{\partial w}{\partial s}\right)^3 dt \bigg|_{s=x_s} \quad (10)$$

Another cantilever device of the present invention is a cantilever device used for an atomic force microscope which measures the surface geometry of a measuring object, comprising: a cantilever equipped with a probe at a tip and capable of vibrating; a vibration source which realizes the cantilever to vibrate in the self-excited mode; a detection mechanism which detects a deflection or a displacement of the cantilever; and a control unit which performs a feedback control of the vibration source based on the deflection or a displacement of the cantilever, wherein a feedback control signal $V_C$ generated by the control unit is given by Equation (11) below:

[Formula 11]

$$V_c = -K_{lin} \int w \, dt|_{S=X_S} + K_{non} \int w^{m+1} dt|_{S=X_S} \quad (11)$$

where $K_{lin}$ is a linear feedback gain which is positive, $K_{non}$ is a nonlinear feedback gain which is positive, w is the deflection amount or displacement of the cantilever, $X_S$ is a sensing point for the cantilever, and m is an even number equal to or larger than 2.

Further, this cantilever device according to a variation is characterized in that the feedback control signal $V_C$ generated by the control unit is given by Equation (12) below:

[Formula 12]

$$V_c = -K_{lin} \int w \, dt|_{S=X_S} + K_{non} \int w^3 dt|_{S=X_S} \quad (12)$$

A cantilever controlling method according to an aspect of the present invention is a cantilever controlling method for a cantilever device used for an atomic force microscope which measures a surface geometry of a measuring object, in which the cantilever device comprising a cantilever equipped with a probe at a tip and capable of vibrating, a vibration source which realizes the cantilever to vibrate in the self-excited mode, a detection mechanism which detects a deflection angle of the cantilever, and a control unit which performs a feedback control of the vibration source based on the deflection angle of the cantilever, wherein the control unit controls the vibration source based on a feedback control signal $V_C$ given by Equation (13) below:

[Formula 13]

$$V_c = -K_{lin} \int \frac{\partial w}{\partial s} dt \bigg|_{s=x_s} + K_{non} \int \left(\frac{\partial w}{\partial s}\right)^{m+1} dt \bigg|_{s=x_s} \quad (13)$$

where $K_{lin}$ is a linear feedback gain which is positive, $K_{non}$ is a nonlinear feedback gain which is positive, $\partial w/\partial s$ is the deflection angle of the cantilever, $X_S$ is a sensing point for the cantilever, and m is an even number equal to or larger than 2.

Further, this cantilever controlling method according to a variation is characterized in that the control unit controls the vibration source based on the feedback control signal $V_C$ given by Equation (14) below:

[Formula 14]

$$V_c = -K_{lin} \int \frac{\partial w}{\partial s} dt \bigg|_{s=x_s} + K_{non} \int \left(\frac{\partial w}{\partial s}\right)^3 dt \bigg|_{s=x_s} \quad (14)$$

Another cantilever controlling method of the present invention is a cantilever controlling method for a cantilever device used for an atomic force microscope which measures a surface geometry of a measuring object, in which the cantilever device comprising a cantilever equipped with a probe at a tip and capable of vibrating, a vibration source which realizes the cantilever to vibrate in the self-excited mode, a detection mechanism which detects a deflection amount or a displacement of the cantilever, and a control unit which performs a feedback control of the vibration source based on the deflection amount or displacement of the cantilever, wherein the control unit controls the vibration source based on a feedback control signal $V_C$ given by Equation (15) below:

[Formula 15]

$$V_c = -K_{lin} \int w\, dt|_{s=X_S} + K_{non} \int w^{m+1} dt|_{s=X_S} \quad (15)$$

where $K_{lin}$ is a linear feedback gain which is positive, $K_{non}$ is a nonlinear feedback gain which is positive, w is the deflection amount or the displacement of the cantilever, $X_S$ is a sensing point for the cantilever, and m is an even number equal to or larger than 2.

Furthermore, this cantilever controlling method according to a variation is characterized in that the control unit controls the vibration source based on the feedback control signal $V_C$ given by Equation (16) below.

[Formula 16]

$$V_c = -K_{lin} \int w\, dt|_{s=X_S} + K_{non} \int w^3 dt|_{s=X_S} \quad (16)$$

The above-described cantilever device and cantilever controlling method according to the present invention enable the stable amplitude control of a cantilever through feedback using measurement data on any of a deflection angle, a deflection, and a displacement of the cantilever.

BRIEF DESCRIPTION OF THE DRAWINGS

FIG. 3 is a perspective view schematically showing a configuration of an AFM device according to the embodiment of the present invention;

FIGS. 4A and 4B are a side view showing a schematic configuration of the measuring method for a deflection angle used in the AFM device according to the embodiment of the present invention and a front view of a photodetector in the deflection angle measuring mechanism, where the deflection angle measuring mechanism uses an optical lever method;

DETAILED DESCRIPTION OF PREFERRED EMBODIMENTS

A cantilever device and cantilever controlling method therefore according to an embodiment of the present invention will be described below referencing the drawings.

(Analytical Model of Cantilever)

Figure 1:
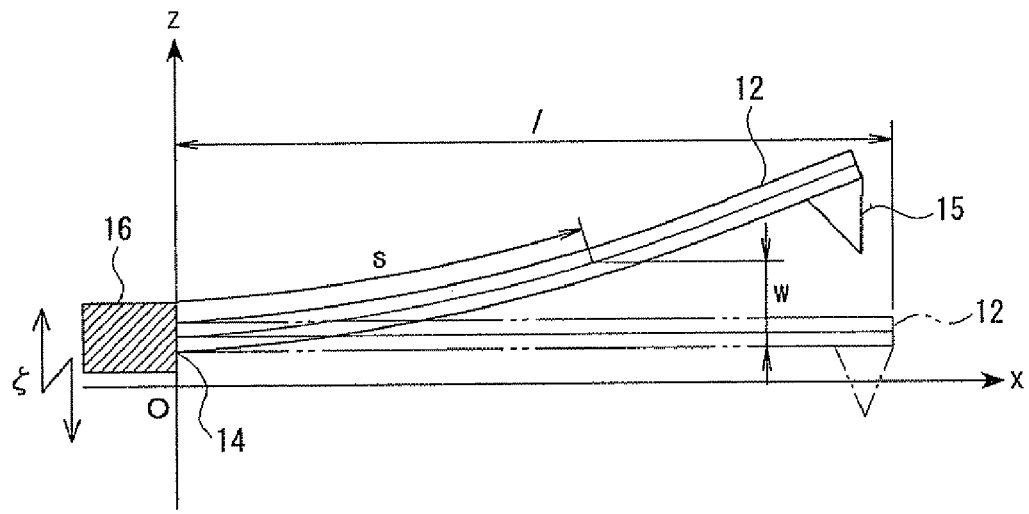
FIG. 1 is a side view showing an analytical model of a cantilever in an AFM device according to an embodiment of the present invention.

FIG. 1 shows an analytical model of an AFM cantilever according to the embodiment of the present invention. The equation of motion is derived by regarding this AFM cantilever 12 (hereinafter simply referred to as "cantilever") as an Euler-Bernoulli beam. An x-axis is chosen along the length direction of the cantilever 12 and a z-axis is chosen along the direction of deflection. It is assumed that the cantilever 12 moves in a z-x plane. Suppose the cantilever 12 has a length of l. Let s denote a distance from a fixed end 14 to an arbitrary point p on a neutral plane, let u denote a displacement of the point p along the x-axis direction, and let w denote a displacement of the point p along the z-axis direction. The fixed end 14 of the cantilever 12 is connected to a piezo element 16 which is a piezoelectric actuator. The piezo element 16 can provide a displacement input $\zeta$ along the z-axis direction to the fixed end 14, and this displacement input $\zeta$ is given as a control input for the cantilever 12. Further, the cantilever 12 has a probe 15 provided on the under surface side of its tip.

(Theoretical Analysis of the Model)

First, the kinetic energy T and the potential energy V of the cantilever are each given by Equations (17) and (18), respectively.

[Formula 17]

$$T = \frac{1}{2}\rho A\left\{\left(\frac{\partial u}{\partial t}\right)^2 + \left(\frac{\partial w}{\partial t} + \frac{\partial \zeta}{\partial t}\right)^2\right\} \quad (17)$$

[Formula 18]

$$V = \frac{1}{2}EI\left(\frac{\partial^2 w}{\partial s^2} + \frac{\partial u}{\partial s}\frac{\partial^2 w}{\partial s^2} - \frac{\partial^2 u}{\partial s^2}\frac{\partial w}{\partial s}\right)^2 + O(w^4) \quad (18)$$

When a Lagrange multiplier $\lambda$ is used, a condition under which the neutral plane does not undergo elongation due to bending is introduced as shown in Equation (19).

[Formula 19]

$$F\left(\frac{\partial u}{\partial s}, \frac{\partial w}{\partial s}\right) = 1 - \left(\frac{\partial w}{\partial s}\right)^2 - \left(1 + \frac{\partial w}{\partial s}\right)^2 = 0 \quad (19)$$

An extended Hamiltons principle is described as shown by Equation (20), and when a variational calculation is calculated, an equation of motion given by Equation (21) is obtained. A boundary condition is given by Equation (22).

[Formula 20]

$$\delta \int_{t_2}^{t_1} \int_0^l \left[T - V + \lambda F\left(\frac{\partial u}{\partial s}, \frac{\partial w}{\partial s}\right)\right] ds \, dt = 0 \quad (20)$$

-continued

[Formula 21]

$$\rho A\left(\frac{\partial^2 w}{\partial t^2} + \frac{\partial^2 \zeta}{\partial t^2}\right) + EI\frac{\partial^4 w}{\partial s^4} + C_{lin}\frac{\partial w}{\partial t} + \\
EI\left[\frac{\partial^4 w}{\partial s^4}\left(\frac{\partial w}{\partial s}\right)^2 + 4\frac{\partial w}{\partial s}\frac{\partial^2 w}{\partial s^2}\frac{\partial^3 w}{\partial s^3} + \left(\frac{\partial^2 w}{\partial s^2}\right)^3\right] + \\
\frac{\partial}{\partial s}\left\{\rho A\frac{\partial w}{\partial s}\int_1^s \int_0^s \left[\left(\frac{\partial^2 w}{\partial s \partial t}\right)^2 + \frac{\partial w}{\partial s}\frac{\partial^3 w}{\partial s \partial t^2}\right] ds \, ds\right\} = 0 \quad (21)$$

[Formula 22]

$$\left.\frac{\partial^3 w}{\partial s^3}\right|_{s=1} = \left.\frac{\partial^2 w}{\partial s^2}\right|_{s=l} = \left.\frac{\partial w}{\partial s}\right|_{s=0} = w|_{s=0} = 0 \quad (22)$$

In the following description an apostrophe "'" represents a partial differential with respect to s and a superscript "·" represents a partial differential with respect to t. Also, $\rho$, A, E, and I represent respectively, density, cross-sectional area, Young's modulus, and geometrical moment of inertia, which take a linear viscous damping term $C_{lin} \partial w/\partial s$ in the measurement environment in the consideration. If the vibration displacement input $\zeta$ is applied by the piezo element 16, a relationship between the feedback control signal $V_C$ of the piezo element 16 (control voltage) and the vibration displacement input $\zeta$ is given by Equation (23) using a piezoelectric constant $d_{33}$.

Incidentally, the piezoelectric constant $d_{33}$ is described, for example, in C. R. Fuller, S. Elliot, and P. Nelson, "Active Control of Vibration" (1996), pp. 115-120, Academic Press, London.

[Formula 23]

$$\zeta = d_{33} V_c \quad (23)$$

In order to realize the van der Pol self-oscillation, conventional atomic force microscopes use the control voltage $V_C$ represented by Equation (24) by feeding back first-order derivatives of a deflection angle of the cantilever 12 with respect to time t.

[Formula 24]

$$V_c = -K_{lin}\left.\frac{\partial^2 w}{\partial s \partial t}\right|_{s=l} + K_{non}\left(\left.\frac{\partial w}{\partial s}\right|_{s=l}\right)^2 \left.\frac{\partial^2 w}{\partial s \partial t}\right|_{s=l} \quad (24)$$

However, by noticing that the control input appears directly as an acceleration represented by $\partial^2 \zeta/\partial t^2$ as shown in Equation (21), the present embodiment represents $V_C$ by Equation (25).

[Formula 25]

$$V_c = -K_{lin} \int \left.\frac{\partial w}{\partial s}\right|_{s=x_s} dt + K_{non} \int \left(\left.\frac{\partial w}{\partial s}\right)^3\right|_{s=l} dt \quad (25)$$

$K_{lin}$ (>0) and $K_{non}$ (>0) represent the linear feedback gain and the nonlinear feedback gain, respectively. The acceleration $\partial^2 \zeta/\partial t^2$ of the beam (cantilever 12) caused by the control input when x=0 is given by Equation (26). In addition, if the representative length of the cantilever 12 is l and the representative time is $T=\sqrt{(\rho A l^4/EI)}$, the equation of motion given by Equation (21) becomes dimensionless as shown in Equation (27). At this time, the boundary condition is given by Equation (28).

[Formula 26]

$$\frac{\partial^2 \zeta}{\partial t^2} = d_{33}\left[-K_{lin} + 3K_{non}\left(\frac{\partial w}{\partial s}\right)^2\bigg|_{s=1}\right]\frac{\partial^2 w}{\partial s \partial t}\bigg|_{s=1} \qquad (26)$$

[Formula 27]

$$\ddot{w}^* + w^{*''''} + \mu_{lin}\dot{w}^* + w^{*''''}w^{*'2} + 4w^{*'}w^{*''}w^{*''} + \\ w^{*''3} + \left[w^{*'}\int_1^{s^*}\int_0^{s^*}(\dot{w}^{*'2} + w^{*'}\ddot{w}^{*'})ds^*ds^*\right]' \qquad (27) \\ = +(k^*_{lin} - k^*_{non}w^{*'2}|_{s^*=1})\dot{w}^{*'}|_{s^*=1}$$

[Formula 28]

$$w^{*''}|_{s^*=1} = w^{*'''}|_{s^*=1} = w^{*''}|_{s^*=0} = w^*|_{s^*=0} = 0 \qquad (28)$$

It is assumed that a dimensionless damping coefficient and the feedback gains are given by Equations (29) to (31), where a superscript "*" represents a dimensionless quantity, but in formulas after Equation (31) the superscript "*" is omitted.

[Formula 29]

$$\mu_{lin} = \frac{C_{lin}l^2}{\sqrt{\rho A E I}} \qquad (29)$$

[Formula 30]

$$k^*_{lin} = d_{33}l\sqrt{\frac{\rho A}{EI}}K_{lin} \qquad (30)$$

[Formula 31]

$$k^*_{non} = 3d_{33}l\sqrt{\frac{\rho A}{EI}}K_{non} \qquad (31)$$

(Analysis Using a Multiple Scale Method)

The dimensionless equation of motion in Equation (27) is analyzed using a Multiple Scale Method. The power series expansion of the displacement w along the z-axis direction, which is assumed using a parameter $\epsilon$ (0<$\epsilon$<<1), and the multiple time scale are introduced as shown in Equations (32) and (33).

[Formula 32]

$$w = \epsilon w_1 + \epsilon^3 w_3 \qquad (32)$$

[Formula 33]

$$t_0 = t, t_2 = \epsilon^2 t \qquad (33)$$

Orders are assigned to each coefficient as shown in Equation (34) so that the effects of the feedback will be reflected on an amplitude equation described later. Here, parameters superscripted by a caret "^" are O(1). The time derivatives with respect to time t are given by Equation (35) in multiple time scales.

[Formula 34]

$$\mu_{lin} = \epsilon^2 \hat{\mu}_{lin}, k_{lin} = \epsilon^2 \hat{k}_{lin}, k_{non} = \hat{k}_{non} \qquad (34)$$

[Formula 35]

$$\frac{d}{dt} = \frac{\partial}{\partial t_0} + \epsilon^2 \frac{\partial}{\partial t_2} \\ \frac{d^2}{dt^2} = \frac{\partial^2}{\partial t_0^2} + 2\epsilon^2\frac{\partial^2}{\partial t_0 t_2} \qquad (35)$$

Hereinafter, differential operators $\partial/\partial t_0 \equiv D_0$ and $\partial/\partial t_2 \equiv D_2$ will be introduced. Substituting Equations (32) and (33) into Equation (27) and equating like powers of $\epsilon$, Equations (36) and (37) are obtained.

[Formula 36]

$$O(\epsilon): D_0^2 w_1 + w_1'''' = 0 \qquad (36)$$

[Formula 37]

$$O(\epsilon^3): D_0^2 w_3 + w_3'''' = \\ -2D_0 D_2 w_1 - \hat{\mu}_{lin} D_0 w_1 - w_1'''' w_1'^2 - 4w_1' w_1'' w_1''' - w_1''^3 - \\ w_1'' \int_1^s \int_0^s \{D_0^2 w_1'^2 + w_1' D_0^2 w_1'\} ds ds - \\ w_1' \int_1^s \{D_0^2 w_1'^2 + w_1' D_0^2 w_1'\} ds + (\hat{k}_{lin} - \hat{k}_{non} w_1'^2) D_0 w_1'\bigg|_{s=1} \qquad (37)$$

From Equation (36), a solution of O($\epsilon$) is given by Equation (38).

[Formula 38]

$$w_1 = \Phi_1(s) A(t_2) e^{j\omega t_0} + C.C. \qquad (38)$$

Complex amplitude A($t_2$) is a function of a time scale $t_2$. Of approximate solutions of O($\epsilon^3$), a term which has the first natural frequency $\omega$ is expressed by Equation (39). Substituting Equations (38) and (39) into Equation (36) and equating coefficients of $e^{j\omega t_0}$ on both sides, Equation (40) is obtained. Here, C(s) can be expressed by Equation (41).

[Formula 39]

$$w_3 = \Phi_3(s, t_2) e^{j\omega t_0} + C.C. \qquad (39)$$

[Formula 40]

$$\Phi_3'''' - \omega^2 \Phi_3 = -2i\omega \Phi_1 D_2 A(t_2) + C(s)|A|^2 A - \\ i\hat{\mu}_{lin}\omega\Phi_1 A + i\omega\{\hat{k}_{lin} - \hat{k}_{non}\Phi_1'|_{s=1}|A|^2\}A\Phi_1'|_{s=1} \qquad (40)$$

[Formula 41]

$$C(s) = -3\Phi_1''''\Phi_1'^2 - 12\Phi_1'\Phi_1''\Phi_1''' + \\ 3\Phi_1''^3 + 2\omega^2\Phi_1''\int_1^s\int_0^s\Phi_1'^2 ds ds + 2\omega^2\Phi_1'\int_1^s\Phi_1'^2 ds \qquad (41)$$

A condition (solvability condition) under which $\Phi_3$ has a solution is determined using $\Phi_1$. By multiplying both sides of Equation (40) by $\Phi_1$ and integrating them from 0 to 1 with respect to s, Equation (42) is obtained, where $\beta_1$ to $\beta_3$ are given by Equations (43) to (45), respectively.

[Formula 42]

$$D_2 A + \left(\frac{\hat{\mu}_{lin}}{2} - \beta_2 \hat{k}_{lin}\right) A + \beta_3 \hat{k}_{non} |A|^2 A + i\beta_1 |A|^2 A = 0 \quad (42)$$

[Formula 43]

$$\beta_1 = \frac{\int_0^1 C(s)\Phi_1 ds}{2\omega \int_0^1 \Phi_1^2 ds} \quad (43)$$

[Formula 44]

$$\beta_2 = \frac{\omega \Phi_1' \big|_{s=1} \int_0^1 \Phi_1 ds}{2\int_0^1 \Phi_1^2 ds} \quad (44)$$

[Formula 45]

$$\beta_3 = \frac{\omega \Phi_1'^3 \big|_{s=1} \int_0^1 \Phi_1 ds}{2\int_0^1 \Phi_1^2 ds} \quad (45)$$

By substituting below-described Equation (46) into Equation (42), multiplying both sides by $\epsilon^3$, and separating the products into a real part and an imaginary part, Equations (47) and (48) for the amplitude a and phase γ are obtained.

[Formula 46]

$$A = \frac{1}{2\varepsilon} a(t) e^{-i\gamma(t)} \quad (46)$$

[Formula 47]

$$\frac{da}{dt} + \left(\frac{\mu_{lin}}{2} - \beta_2 k_{lin}\right) a + \frac{1}{4}\beta_3 k_{non} a^3 = 0 \quad (47)$$

[Formula 48]

$$\frac{d\gamma}{dt} - \frac{1}{4}\beta_1 a^2 = 0 \quad (48)$$

The above equations are equivalent to equations which represent time variations of amplitude and phase of the van der Pol oscillator. That is, according to the feedback based on Equation (25), the cantilever 12 has the similar characteristics to the van der Pol oscillator. When the steady-state amplitude is demanded, the time derivative term in Equation (47) is replaced with 0 (zero), and Equation (49) is obtained.

[Formula 49]

$$a_{st} = 0, \sqrt{\frac{-2(\mu_{lin} - 2\beta_2 k_{lin})}{\beta_3 k_{non}}} \quad (49)$$

Figure 2:
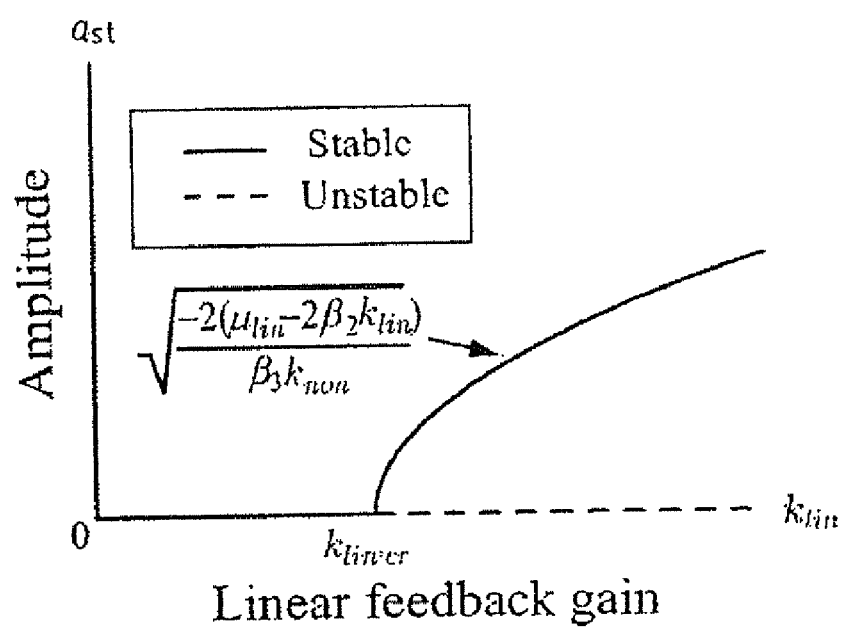
FIG. 2 is a graph showing a relationship between a linear feedback gain $K_{lin}$ and a steady-state amplitude in a van der Pol type cantilever controlling method according to the embodiment of the present invention.

This gives a relationship between the linear feedback gain $K_{lin}$ and the steady-state amplitude as shown in a graph in FIG. 2, $K_{lin-cr} = \mu_{lin}/2\beta_2$ shown in the graph in FIG. 2 gives the critical point of occurrence of self-oscillation. When the linear feedback gain $K_{lin}$ is larger than this critical gain $K_{lin-cr}$, the cantilever 12 self-oscillates due to the supercritical Hopf bifurcation. Also, since the nonlinear feedback gain $K_{non}$ is in the denominator of Equation (49), it can be seen that by increasing $K_{non}$, it is possible to keep down the steady-state amplitude when the self-oscillation of the cantilever 12 occurs. Further, by solving Equation (48), Equation (50) is obtained.

[Formula 50]

$$\gamma = \frac{1}{4}\beta_1 a_{st}^2 t + \gamma_0 \quad (50)$$

A phase of the oscillating cantilever 12 can be determined using above-described Equation (50), where $\gamma_0$ is an initial phase which can be determined from an initial value. Thus, the steady-state of the self-oscillation is given by Equation (51).

[Formula 51]

$$v = a_{st} \cos\left[\left(\omega - \frac{1}{4}\beta_1 a_{st}^2\right)t - \gamma_0\right] \quad (51)$$

A self-oscillation frequency Ω of the cantilever 12 is a linear natural frequency of the cantilever 12 and is given by Equation (52). According to Equation (52), when the steady-state amplitude $a_{st}$ is very small, Ω is approximately equal to ω. Also, since $\beta_1 > 0$, when the steady-state amplitude increases, the cantilever 12 oscillates at a frequency lower than its natural frequency.

[Formula 52]

$$\Omega = \omega - \frac{1}{4}\beta_1 a_{st}^2 \quad (52)$$

(Configuration of the AFM Device)

FIG. 3 schematically shows a configuration of an AFM device according to the present embodiment. FIGS. 4A and 4B show a configuration of a deflection angle measuring mechanism used in the AFM device shown in FIG. 3, where the deflection angle is measured by an optical lever method.

In the AFM device 10, the fixed end of the cantilever 12 is connected to the piezo element 16, and the piezo element 16 vibrates the cantilever 12. The deflection angle measuring mechanism 20 comprises a laser diode 22, a prism 24, a directing mirror 26 and a photodetector 28 as shown in FIG. 4A. The laser diode 22 (Laser Pointer MLXG-D12-670 manufactured by Kikoh Giken Co. Ltd.) irradiates a laser beam B at a tip on an upper surface of the cantilever 12 via the prism 24.

The reflected laser beam B reflected by the cantilever 12 is further reflected by the directing mirror 26 and incidents the photodetector 28 (S7479 manufactured by Hamamatsu Photonics K.K.). At this moment if the cantilever 12 deflects, a reflection angle of the laser beam B changes, and the point at which laser beam B hits at the photodetector 28 changes as well.

As shown in FIG. 4B, the photodetector 28 has a segmented structure made up of four light-receiving areas 28A through 28D in order to detect changes in an incident angle based on differences in the amount of light received (light flux ratio) between the upper light-receiving areas 28A and 28B and the lower light-receiving areas 28C and 28D. Further, referring to FIG. 3, the reference numeral 70 denotes a microdisplacement gage, 72 denotes a tube scanner, and 74 denotes a sample stage.

Figure 5:
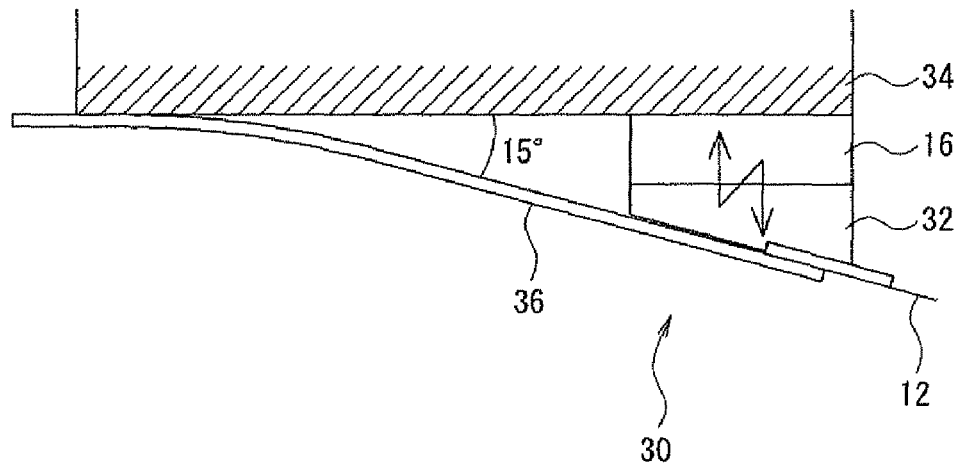
FIG. 5 is a side view showing a configuration of a cantilever holder in the AFM device according to the embodiment of the present invention.

FIG. 5 shows a configuration of the cantilever 12 and a cantilever holder in the AFM device according to the embodiment of the present invention. The cantilever holder 30 comprises a supporting stand 32 which has substantially a right-triangular formed cross section along the length direction of the cantilever 12. The piezo element 16 is fastened to an upper face of the supporting stand 32. The supporting stand 32 is fixed to a frame member 34 of the AFM device via the piezo element 16.

The cantilever holder 30 has a phosphor-bronze leaf spring 36, which is fixed to the frame member 34 at the base end, and the tip is urged toward the supporting stand 32 by the restoring force of the spring. The cantilever holder 30 supports the cantilever 12 at one end by pinching the base end of the cantilever 12 between a lower face of the supporting stand 32 and the tip of the leaf spring 36. The cantilever 12 is supported in such a way that its length direction axis will be inclined approximately 15 degrees from the horizontal direction.

Incidentally, although the AFM device 10 detects the deflection angle of the cantilever 12 by the optical lever method using the deflection angle measuring mechanism 20, a displacement measuring mechanism detecting the displacement of the cantilever 12 may use such as a non-contact-type laser Doppler vibrometer or a contact-type microdisplacement gage which uses a piezo element or the like.

Also, although the AFM apparatus 10 uses the piezo element 16 as a contact-type vibration source of the cantilever 12, besides these vibration source, a non-contact vibration source such as a voice-coil type vibration source driven by electromagnetic force or an electrostatic actuator driven by electrostatic force may be used alternatively.

(Configuration of a Control Unit)

Figure 6:
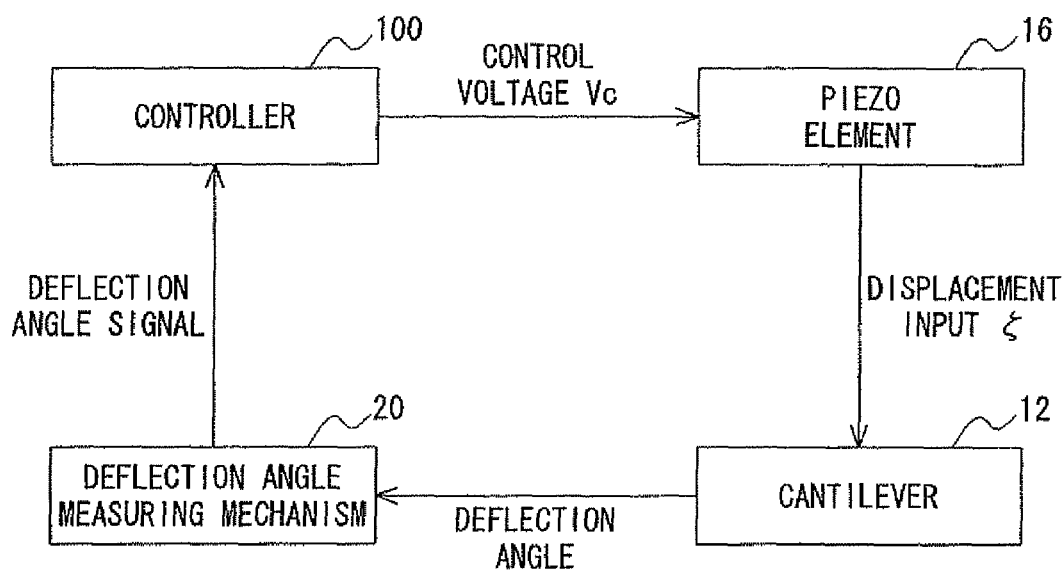
FIG. 6 is a block diagram showing a configuration of the AFM device according to the embodiment of the present invention.

As shown in a block diagram of FIG. 6, the AFM device 10 comprises a controller 100 which is a control unit. The controller 100 generates a voltage signal, which is a feedback control signal based on a deflection angle signal of the cantilever 12 detected by the deflection angle measuring mechanism 20, and outputs this voltage signal as the control voltage $V_C$ to the piezo element 16, which is a vibration source. Consequently, the piezo element 16 transmits the vibration displacement corresponding to the control voltage $V_C$ to the cantilever 12 and thereby realizes the cantilever 12 to vibrate in the self-excited mode.

Figure 7:
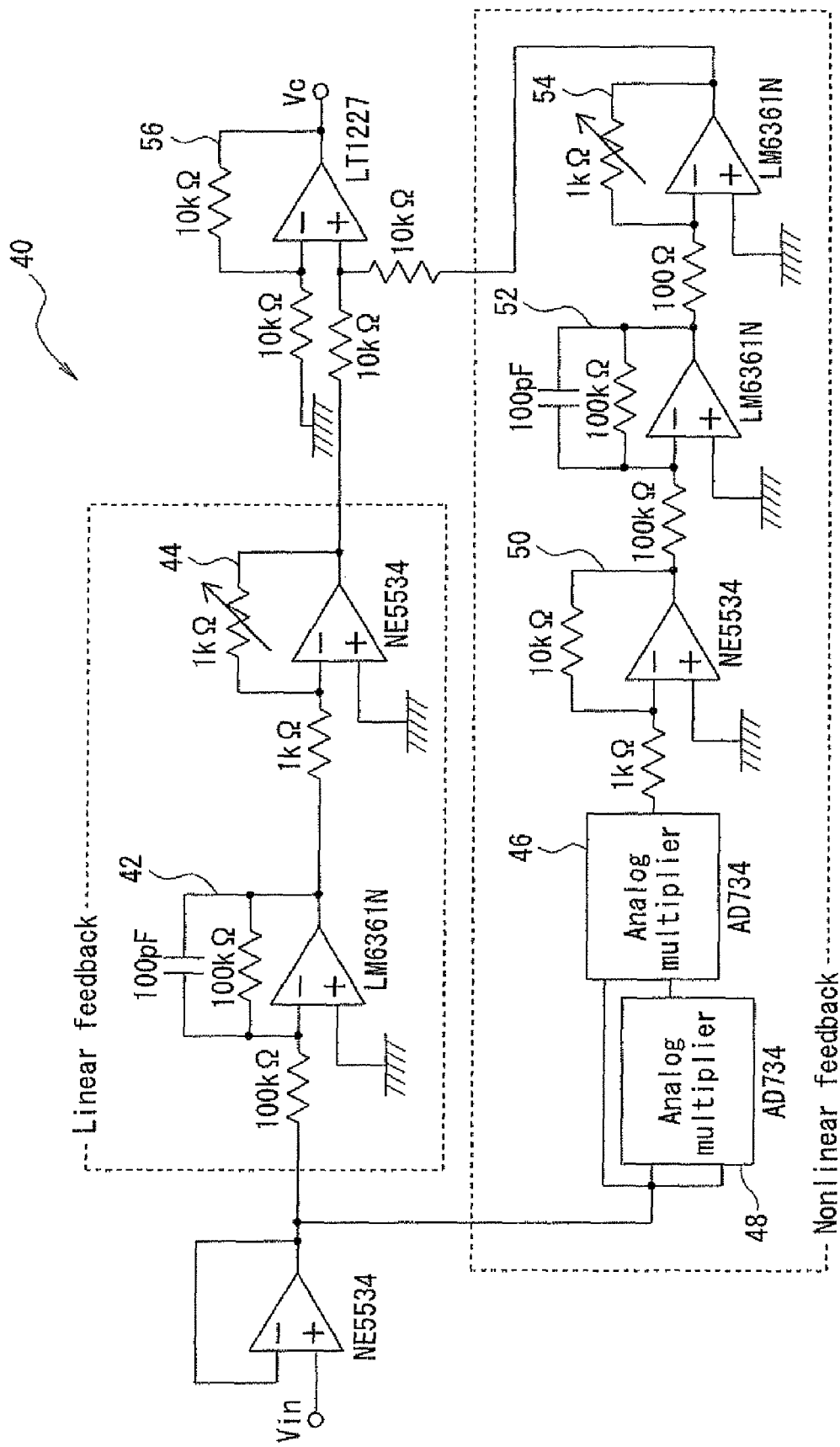
FIG. 7 is a circuit diagram showing a configuration of a van der Pol self-oscillating circuit used in the AFM device according to the embodiment of the present invention.

FIG. 7 shows a configuration of a van der Pol self-oscillating circuit (equivalent circuit) functionally implementing by a program for the controller 100 shown in FIG. 6. As described above, by using a linear feedback and a nonlinear feedback, the AFM device 10 makes a vibration system of the cantilever 12 as a vibration system similar to a van der Pol oscillator.

The van der Pol self-oscillating circuit 40 (hereinafter simply referred to as "self-oscillating circuit") is an analog control circuit used to realize a linear feedback proportional to the deflection angle of the cantilever 12 and a nonlinear feedback proportional to the third power of the deflection angle, shown in Equation (25).

The self-oscillating circuit 40 integrates the deflection angle signal of the cantilever 12 detected from the deflection angle measuring mechanism 20 by using an integrator 42, multiplies a resulting integral value by the linear feedback gain $K_{lin}$ generated by a gain generator 44, and thereby generates an output corresponding to the linear feedback signal of Equation (25). Also, the self-oscillating circuit 40 cubes the deflection angle signal using the analog multipliers 46 and 48, integrates the resulting values using the integrators 50 and 52, multiplies the resulting integral values by the nonlinear feedback gain $K_{non}$ generated by a gain generator 54, and thereby generates an output corresponding to the nonlinear feedback signal in Equation (25).

Furthermore, the self-oscillating circuit 40 adds the output corresponding to the linear term and the output corresponding to the nonlinear term together using an adder 56, and thereby a voltage signal $V_{out}$ is generated. The voltage signal $V_{out}$ is converted into a voltage value for the piezo element 16 as required and applied to the piezo element 16 as a control voltage $V_C$ for the cantilever 12.

Incidentally, although according to the present embodiment the self-oscillating circuit 40 is implemented as an analog control circuit by the controller 100, a similar self-oscillating circuit may be implemented as a digital control circuit by a controller 102.

Figure 8:
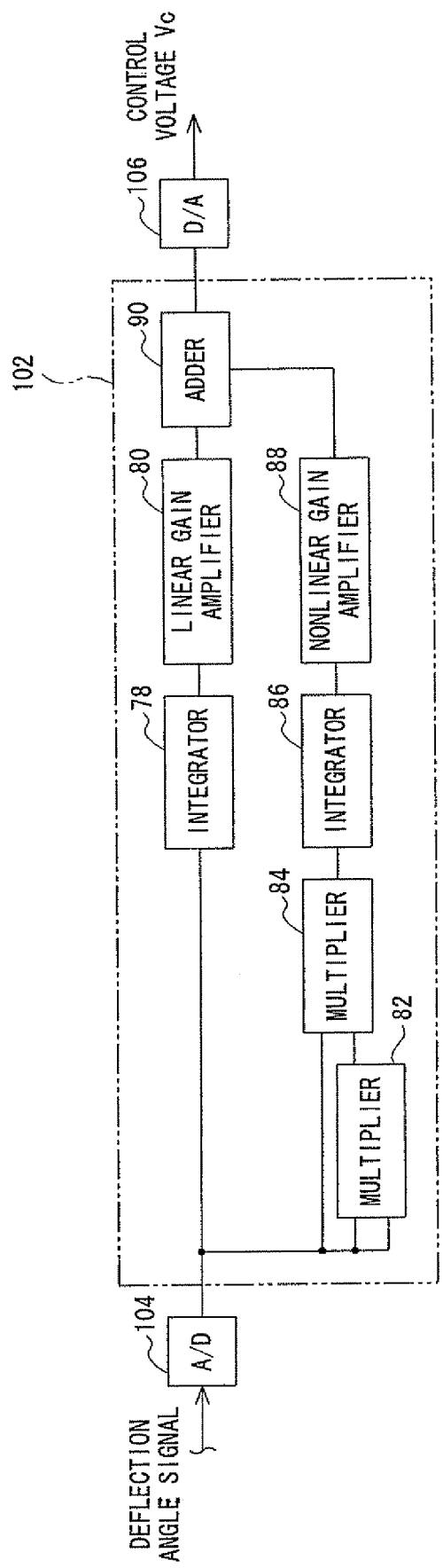
FIG. 8 is a block diagram showing a configuration of a control unit functionally implementing a self-oscillating circuit as a digital control circuit.

In that case, the AFM device 10 will comprise an A/D (analog/digital) converter 104 interposed between the deflection angle measuring mechanism 20 and the controller 102, and a D/A (digital/analog) converter 106 interposed between the controller 102 and the piezo element 16, as shown in FIG. 8.

The A/D converter 104 converts the analog signal of the deflection angle of the cantilever 12 outputted from the deflection angle measuring mechanism 20 into a digital signal, and outputs the digital signal to the controller 102. On the other hand, the D/A converter 106 converts the digital voltage signal $V_{out}$ outputted from the controller 100 into the control voltage $V_C$, which is an analog voltage signal, and outputs the control voltage $V_C$ to the piezo element 16.

On the other hand, an integrator 78 and the linear gain amplifier 80, which digitally process input signals, are provided in the controller 102. The integrator 78 and the linear gain amplifier 80 generate an output corresponding to the linear feedback signal (digital signal) in Equation (25) based on the deflection angle signal (a digital signal) of the cantilever 12 detected by the deflection angle measuring mechanism 20. Also, a multiplier 82, a multiplier 84, an integrator 86, and a nonlinear gain amplifier 88, which digitally process input signals, are provided in the controller 102 and generate an output corresponding to the nonlinear feedback signal (a digital signal) in Equation (25) based on the deflection angle signal (a digital signal) of the cantilever 12 detected by the deflection angle measuring mechanism 20.

The controller 102 adds the linear feedback signal outputted from the linear gain amplifier 80 and the nonlinear feedback signal outputted from the nonlinear gain amplifier 88 together using an adder 90 and outputs the sum value as the voltage signal $V_{out}$ to the D/A converter 106.

With the AFM device 10, even when the self-oscillating circuit is configured as a digital control circuit using the controller 102 and the control voltage $V_C$ is generated using the self-oscillating circuit, A/D converter 104, and D/A converter 106, the same results are obtained as when the control voltage $V_C$ is generated using the self-oscillating circuit 40.

(Experimental Results Using the AFM Apparatus)

Next, the results of self-oscillation experiments conducted using the AFM device 10 according to the present embodiment is described (refer to FIG. 3).

A 450-μm-long, 50-μm-wide, and 4-μm-thick cantilever 12 (SI-DF3 manufactured by Seiko Instruments Inc.) is installed on the AFM device 10. The cantilever 12 has a first mode natural frequency of 23 to 31 kHz.

(a) Method for Measuring Cantilever Amplitude

The present experiment is intended to realize the self-oscillation at the first mode natural frequency generally used in AFM device. When only a linear feedback control component was applied to the cantilever 12, the cantilever 12 self-oscillated. At this moment, a deflection angle measuring mechanism 20 of the optical lever type was used to measure the motion of the cantilever 12. A laser beam B was irradiated close to the tip of the cantilever 12 and an output signal obtained was measured. The amplitude and frequency close to the tip of the cantilever 12 were measured by performing a FFT (Fast Fourier Transform) analysis on the output signal from the deflection angle measuring mechanism 20.

(b) Amplitude Control Using a van der Pol Self-Oscillating Circuit

Figure 9:
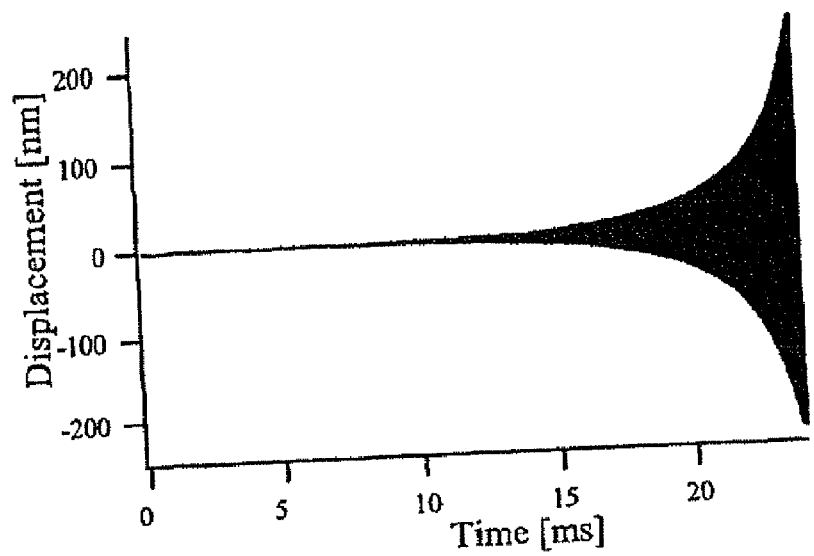
FIG. 9 is a graph showing a time-history waveform obtained when a control input voltage corresponding to the linear feedback is only applied to a piezo element.
Figure 10:
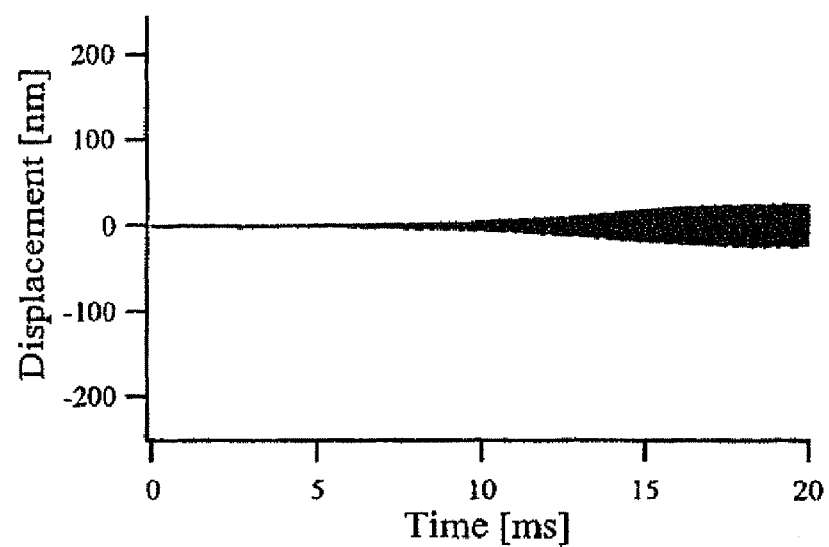
FIG. 10 is a graph showing a time-history waveform obtained when the control input voltages corresponding to the linear feedback and the nonlinear feedback are applied to a piezo element.

FIG. 9 shows a time-history waveform obtained when a control input voltage corresponding to the linear feedback gain is only applied to a piezo element. FIG. 10 shows a time-history waveform obtained when the control input voltages corresponding to the linear feedback gain and the nonlinear feedback gain are applied to a piezo element.

It can be seen that when a piezo element is controlled using only a linear feedback, the amplitude increases and eventually diverges over time. On the other hand, it can be seen that when the piezo element is controlled using both linear feedback and nonlinear feedback, the amplitude converges to a certain extent and the cantilever oscillates with a steady-state amplitude unlike when the piezo element is actuated using the linear feedback only.

(c) Realization of Low-Amplitude, Steady-State Self-Oscillation

Figure 11:
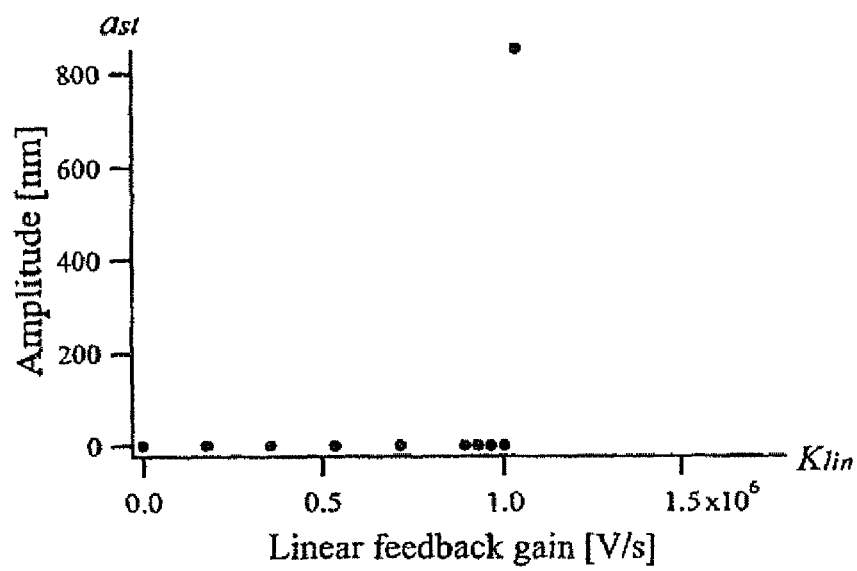
FIG. 11 is a graph showing a relationship between the steady-state amplitude of the self-oscillation and the linear feedback gain in the case without a nonlinear feedback.
Figure 12:
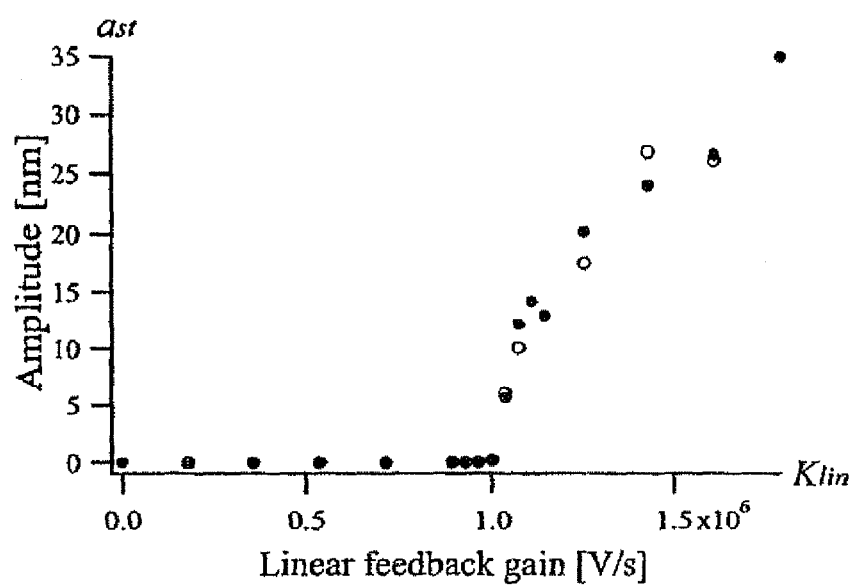
FIG. 12 is a graph showing a relationship between the steady-state amplitude of the self-oscillation and the linear feedback gain in the case with a small nonlinear feedback.
Figure 13:
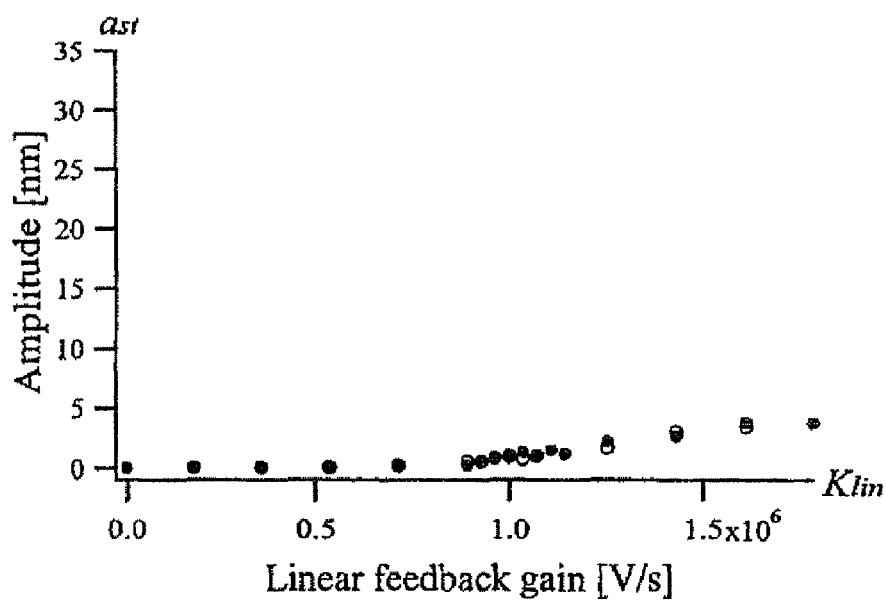
FIG. 13 is a graph showing a relationship between the steady-state amplitude of the self-oscillation and the linear feedback gain in the ease with a large nonlinear feedback.

FIGS. 11, 12, and 13 show relationships between the steady-state amplitude of the self-oscillation and the linear feedback gain, where the abscissa represents the linear feedback gain $K_{lin}$ and the ordinate represents the steady-state amplitude $a_{st}$ of the self-oscillation. The linear feedback gain is plotted using black dots "●" when it is increased and it is plotted using white dots "○" when it is decreased. It can be seen that whereas the amplitude diverges soon after the critical gain $K_{lin-cr}$ is exceeded when only the linear feedback is used as shown in FIG. 11, on the other hand, it can be seen that the amplitude is controlled by the effect of the nonlinear feedback gain when both linear feedback and nonlinear feedback are used as shown in FIG. 12.

Further in FIG. 13, it can be seen that the amplitude is further decreased as the nonlinear feedback gain $K_{non}$ is increased. At this moment, the self-oscillation with the steady-state amplitude of approximately 4 nm was observed when the linear feedback gain was sufficiently higher than a bifurcation point (the critical gain $K_{lin-cr}$) and high enough to cause stable self-oscillation.

Figure 14:
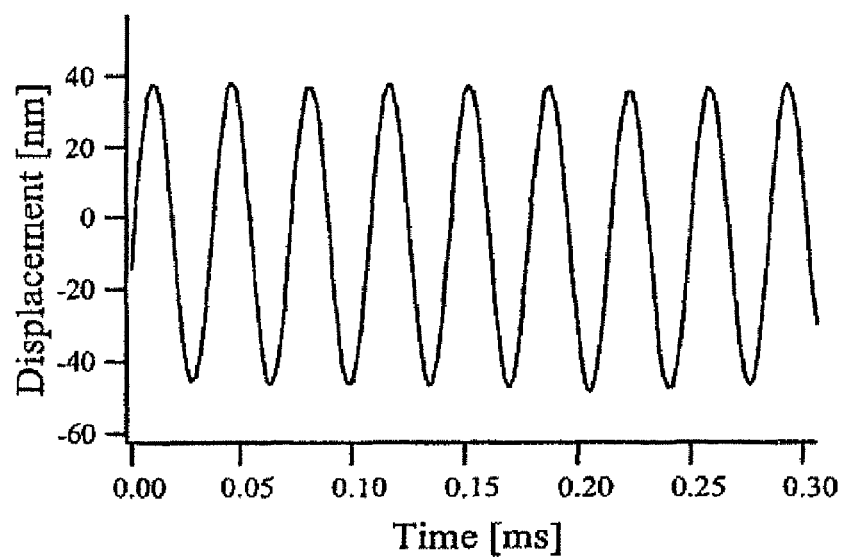
FIG. 14 is a graph showing a relationship between the optical lever output and time at a linear feedback gain $K_{lin}$ which gives maximum amplitude in FIG. 10.
Figure 15:
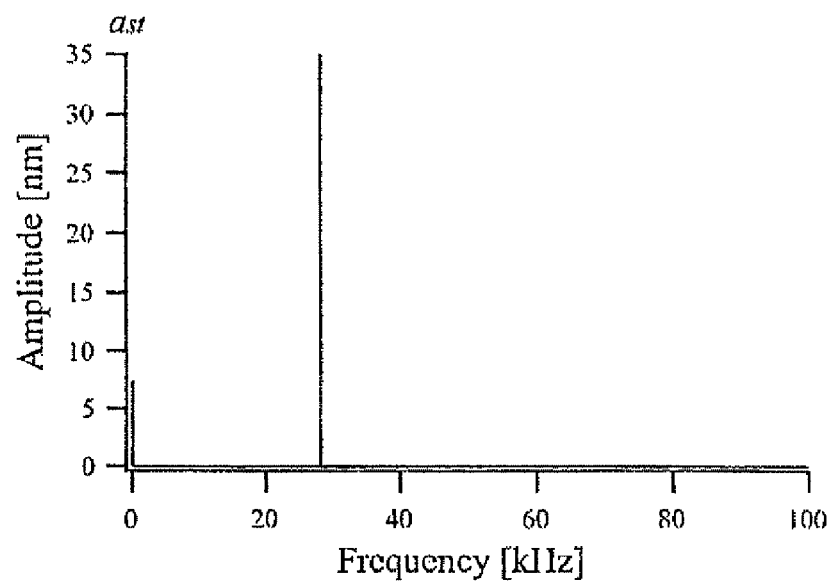
FIG. 15 is a graph showing a relationship between the frequency spectrum and time at a linear feedback gain $K_{lin}$ which gives maximum amplitude in FIG. 10.

Furthermore, the optical lever output and the frequency spectrum at a linear feedback gain $K_{lin}$ of $1.79 \times 10^6$ [V/s], which corresponds to the maximum amplitude in FIG. 12, are shown in FIGS. 14 and 15, respectively. The self-oscillation with the steady-state amplitude can be observed at around 28 kHz from these results.

Considering nonlinear viscous damping, low-amplitude self-oscillation can theoretically be realized if the linear feedback gain $K_{lin}$ is set at around the bifurcation point $K_{lin-cr}$. Actually, however, $K_{lin-cr}$ moves due to the slight changes in the environment, and because of this matter, the state of oscillation becomes unstable. However, if the technique proposed in the present embodiment is used, the amplitude will be kept down even when the linear feedback gain is set at a value sufficiently larger than $K_{lin-cr}$, so that the stabled steady-state oscillation without an occurrence of the oscillation halt will be oscillated.

Also, although the amplitude control by means of a conventional differentiator can realize the low amplitude, the present embodiment, which does not amplify the high-frequency noise by a differentiator, can apply a more accurate vibration input to the piezo element. This makes it possible to adjust a steady-state amplitude of 10 nm or less, which was impossible with an AFM device using a differentiator.

(d) Changes in Self-Oscillation Frequency

Figure 16:
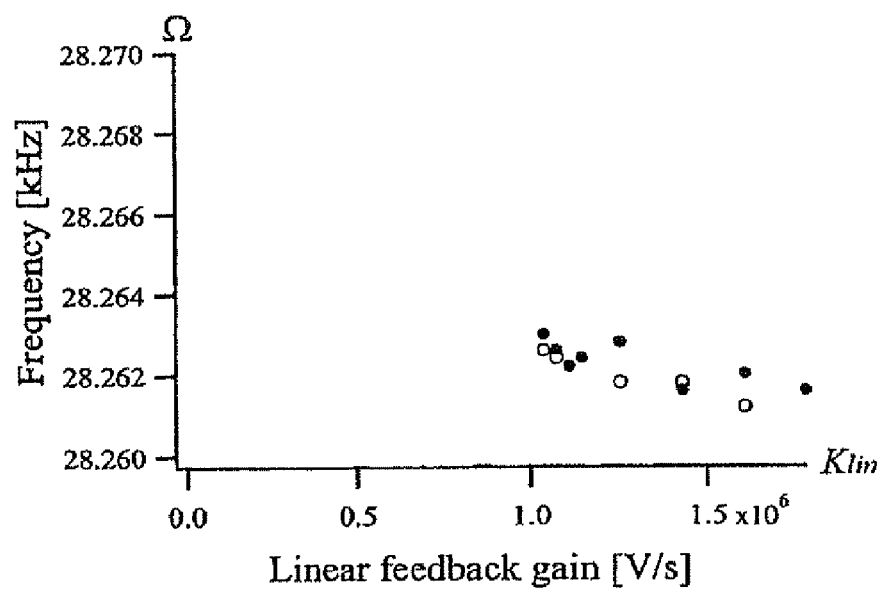
FIG. 16 is a graph showing a relationship between the self-oscillation frequency 52 and the linear feedback gain $K_{lin}$.

FIG. 16 shows a relationship between the self-oscillation frequency $\Omega$ and the linear feedback gain $K_{lin}$. It can be seen from FIG. 16 that with increases in the linear feedback gain $K_{lin}$, i.e., with increases in the response amplitude $a_{st}$, the self-oscillation frequency $\Omega$ decreases. This coincides with the results of discussion indicated in the theoretical analysis according to Equation (52) which expresses the self-oscillation frequency $\Omega$.

(Prototyping a Cantilever Holder for Submerged Observation)

(a) Configuration of a Cantilever Holder

Figure 17:
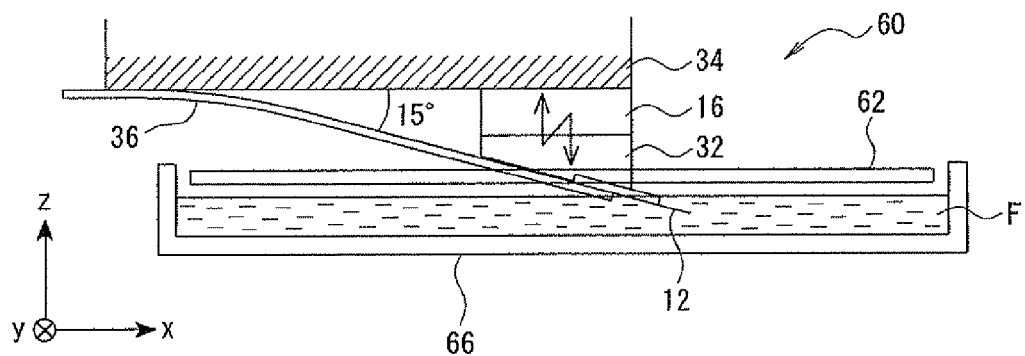
FIG. 17 is a sectional side view showing a schematic configuration of a cantilever holder for observing in a liquid used to observe a biological specimen in a liquid, using the controlling method according to the embodiment of the present invention.
Figure 18:
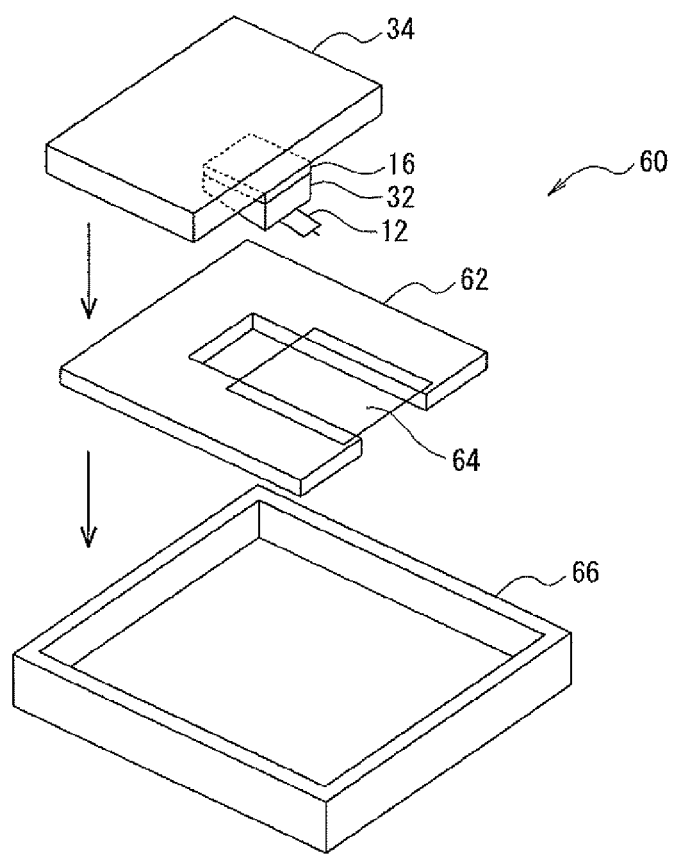
FIG. 18 is an exploded perspective view showing a schematic configuration of a cantilever holder for observing in a liquid used to observe a biological specimen in a liquid, using the controlling method according to the embodiment of the present invention.

FIGS. 17 and 18 show a configuration of a cantilever holder for submerged observation used to observe a biological specimen in a liquid using the controlling method according to the embodiment of the present invention. The cantilever holder 60 is configured such that a liquid F in a petri dish 66 is covered with a stainless steel lid 62 to keep environment of the liquid F constant. The lid 62 is placed to the cantilever holder 60. Further, in order to measure the deflection angle of the cantilever 12 using the deflection angle measuring mechanism 20, a part of the petri dish 66 where an optical path of the laser beam B irradiates through is covered with a glass lid 64 instead of a stainless steel lid. A specimen can be observed in the liquid F by simply replacing the cantilever holder of a conventional AFM device with the cantilever holder 60. Furthermore, the AFM apparatus 10 is configured such that a surface of the piezo element 16 is coated with silicon, making the piezo element 16 water-resistant, to protect the piezo element 16 from the liquid F.

(Variation of the Cantilever Controlling Method)

(a) Generalization of a Controlling Arithmetic Expression

With the AFM device 10 according to the present embodiment described above, the controllers 100 and 102 generate the control voltage $V_C$ by adding the nonlinear feedback proportional to the integral of the third power of the deflection angle of the cantilever 12 with respect to time t to the linear feedback proportional to the integral of the deflection angle of the cantilever 12 with respect to time t as shown in Equation (25). In this way, the AFM device 10 controls so that the self-oscillating cantilever 12 acts as a so-called van der Pol oscillator.

However, the studies and experiments conducted by and for the inventors of the present application have shown that, when the control voltage $V_C$ is generated based on Equation (53) obtained by generalizing the nonlinear term of Equation (25) which is a controlling arithmetic expression for control, the cantilever 12 can be self-oscillated in a stable manner as in the case of the van der Pol oscillator.

[Formula 53]

$$V_c = -K_{lin}\int \frac{\partial w}{\partial s}dt\bigg|_{s=x_S} + K_{non}\int \left(\frac{\partial w}{\partial s}\right)^{m+1} dt\bigg|_{s=x_S} \quad (53)$$

where $K_{lin}$ is the linear feedback gain which is positive, $K_{non}$ is the nonlinear feedback gain which is positive, $\partial w/\partial s$ is the deflection angle of the cantilever, $X_S$ is a sensing point for the cantilever ($X_S=s$, according to the present embodiment (refer to FIG. 1)), and m is an even number equal to or larger than 2. Thus, Equation (25) expresses a case of which m=2 in Equation (53).

Now, when differentiating Equation (53) twice with respect to time t, Equation (54) is obtained which contains each term of Equations (55) through (57). At this moment, Equation (55) represents a term corresponding to a first-order derivative of the deflection angle of the oscillating cantilever 12 with respect to time t, Equation (56) represents a term corresponding to a linear component in the first-order derivative of the deflection angle of the oscillating cantilever 12 with respect to time t, and Equation (57) represents a term corresponding to a nonlinear component in the first-order derivative of the deflection angle of the oscillating cantilever 12 with respect to time t.

[Formula 54]

$$\ddot{V}_c = -K_{lin}\int \frac{\partial w}{\partial s \partial t}\bigg|_{s=x_s} + \frac{K_{non}}{m+1}\int \left(\frac{\partial w}{\partial s}\bigg|_{s=x_s}\right)^m \frac{\partial w}{\partial s \partial t}\bigg|_{s=x_s} \quad (54)$$

[Formula 55]

$$\frac{\partial w}{\partial s \partial t}\bigg|_{s=x_s} \quad (55)$$

[Formula 56]

$$K_{lin}\int \frac{\partial w}{\partial s \partial t}\bigg|_{s=x_s} \quad (56)$$

[Formula 57]

$$\frac{K_{non}}{m+1}\left(\frac{\partial w}{\partial s}\bigg|_{s=x_s}\right)^m \frac{\partial w}{\partial s \partial t}\bigg|_{s=x_s} \quad (57)$$

Thus, by generating the control voltage $V_C$ according to Equation (53), the AFM device 10 can prevent the cantilever 12 from stopping to vibrate in the self-excited mode even in a measurement environment which is a liquid and where the Q value becomes very small. Also, since the steady-state response amplitude of the cantilever 12 is kept constant at a low level amplitude due to a limit cycle created by a Hopf bifurcation, a contact made by the probe 15 of the cantilever 12 with the measuring object is prevented.

Further, in Equation (53) and Equation (54), m only needs to be an even number equal to or larger than 2. However, when m=2, in particular, i.e., when the control voltage $V_C$ is generated based on Equation (25), a solution to the equation of the cantilever motion is given in a simpler equation than an equation given when m takes another value (m=4, 6, 8, or the like).

As a result, since this makes it possible to select the appropriate values of the feedback gains $K_{lin}$ and $K_{non}$ more easily and minimize the number of multiplications of the input signal in the controllers 100 and 102, the circuit which generates the control voltage $V_C$ becomes simple.

(b) Using the Deflection or Displacement of the Cantilever as the Control Input

Although with the AFM device 10 according to the present embodiment, the deflection angle of the cantilever 12 is detected by the deflection angle measuring mechanism 20 and the control voltage $V_C$ is generated by the self-oscillating circuit 40 based on the deflection angle signal of the cantilever 12 outputted from the deflection angle measuring mechanism 20, a laser Doppler vibrometer or the piezo element may be used as an amount-of-deflection measuring mechanism or the displacement measuring mechanism instead of the deflection angle measuring mechanism 20 to measure the deflection or the displacement of the cantilever 12.

When measuring the deflection or the displacement of the cantilever 12 using an amount-of-deflection measuring mechanism or the displacement measuring mechanism, the controllers 100 and 102 generate the control voltage $V_C$ according to Equation (58).

[Formula 58]

$$V_c = -K_{lin}\int w\, dt +|_{S=X_S} + K_{non}\int w^{m+1} dt|_{S=X_S} \quad (58)$$

where $K_{lin}$ is the linear feedback gain which is positive, $K_{non}$ is the nonlinear feedback gain which is positive, w is the deflection or the displacement of the cantilever, $X_S$ is a sensing point for the cantilever ($X_S=s$, according to the present embodiment (refer to FIG. 1)), and m is an even number equal to or larger than 2.

Now, by differentiating Equation (58) twice with respect to time t, Equation (59) is obtained which contains each term of Equations (60) through (62). At this moment, Equation (60) represents a term corresponding to a first-order derivative of the deflection of the cantilever 12 with respect to time t, Equation (61) represents a term corresponding to a linear component in the first-order derivative of the deflection of the cantilever 12 with respect to time t, and Equation (62) represents a term corresponding to a nonlinear component related to the deflection of the cantilever 12 with respect to time t.

[Formula 59]

$$\ddot{V}_c = -K_{lin}\int \frac{\partial w}{\partial t}\bigg|_{s=x_s} + \frac{K_{non}}{m+1}(w|_{s=x_s})^m \frac{\partial w}{\partial t}\bigg|_{s=x_s} \quad (59)$$

[Formula 60]

$$\frac{\partial w}{\partial t}\bigg|_{s=x_s} \quad (60)$$

[Formula 61]

$$K_{lin}\frac{\partial w}{\partial t}\bigg|_{s=x_s} \quad (61)$$

[Formula 62]

$$\frac{K_{non}}{m+1}(w|_{s=x_s})^m \frac{\partial w}{\partial t}\bigg|_{s=x_s} \quad (62)$$

In Equation (58) and Equation (59), m only needs to be an even number equal to or larger than 2. However, when m=2, in particular, the control voltage $V_C$ is given by Equation (63) as shown below.

[Formula 63]

$$V_c = -K_{lin}\int w\, dt|_{S=X_S} + K_{non}\int w^3 dt|_{S=X_S} \quad (63)$$

As shown in Equation (63), when m=2, the self-oscillating cantilever 12 acts as a so-called van der Pol oscillator. On the other hand, when m is an even number of 4 or larger (m=4, 6, 8, or the like), the self-oscillating cantilever 12 also produces the same effect as a van der Pol oscillator.

Thus, even when the deflection or the displacement of the cantilever 12 is measured using an amount-of-deflection measuring mechanism or the displacement measuring mechanism and a signal corresponding to the deflection or the displacement of the cantilever 12 is used as a control input to the controllers 100 and 102, the AFM apparatus 10 can prevent the cantilever 12 from stopping to vibrate in the self-excited mode even in a measurement environment which is a liquid and the Q value becomes very small. Also, since the steady-state response amplitude of the cantilever 12 is kept constant at a low level due to a limit cycle created by a Hopf bifurcation, a contact made by the probe 15 of the cantilever 12 with the measuring object is prevented.

Further, in particular, when m=2 in Equation (58), i.e., when the control voltage $V_C$ is generated based on Equation (63), a solution to the equation of motion of the cantilever is given in a simpler equation than an equation given when m takes another value (m=4, 6, 8, or the like). As a result, since this makes it possible to select the appropriate values of the feedback gains $K_{lin}$ and $K_{non}$ more easily and minimize the number of multiplications of the input signal in the controllers 100 and 102, the circuit which generates the control voltage $V_C$ becomes simple.

What is claimed is:

1. A cantilever device used for an atomic force microscope which measures a surface geometry of a measuring object, comprising:
    a cantilever equipped with a probe at a tip and capable of vibrating;
    a vibration source which realizes the cantilever to vibrate in a self-excited mode;
    a detection mechanism which detects a deflection angle of the cantilever; and
    a control unit which performs a feedback control of the vibration source based on the deflection angle of the cantilever; wherein
    a feedback control signal $V_C$ generated by the control unit is given by the following equation:

$$V_c = -K_{lin} \int \frac{\partial w}{\partial s} dt \bigg|_{s=x_S} + K_{non} \int \left(\frac{\partial w}{\partial s}\right)^{m+1} dt \bigg|_{s=x_S};$$

and wherein $K_{lin}$ is a linear feedback gain which is positive;
$K_{non}$ is a nonlinear feedback gain which is positive;
$\partial w/\partial s$ is the deflection angle of the cantilever;
$X_S$ is a sensing point for the cantilever; and
m is an even number equal to or larger than 2.

2. The cantilever device according to claim 1, wherein the feedback control signal $V_C$ generated by the control unit is given by the following equation:

$$V_c = -K_{lin} \int \frac{\partial w}{\partial s} dt \bigg|_{s=x_S} + K_{non} \int \left(\frac{\partial w}{\partial s}\right)^{3} dt \bigg|_{s=x_S}.$$

3. A cantilever device used for an atomic force microscope which measures a surface geometry of a measuring object, comprising:
    a cantilever equipped with a probe at a tip and capable of vibrating;
    a vibration source which realizes the cantilever to vibrate in a self-excited mode;
    a detection mechanism which detects a deflection or a displacement of the cantilever; and
    a control unit which performs a feedback control of the vibration source based on the deflection or the displacement of the cantilever; wherein
    a feedback control signal $V_C$ generated by the control unit is given by the following equation:

$$V_c = -K_{lin} \int w \, dt|_{S=X_S} + K_{non} \int w^{m+1} dt|_{S=X_S};$$ and wherein $K_{lin}$ is a linear feedback gain which is positive;
$K_{non}$ is a nonlinear feedback gain which is positive;
w is the deflection or the displacement of the cantilever;
$X_S$ is a sensing point for the cantilever; and
m is an even number equal to or larger than 2.

4. The cantilever device according to claim 3, wherein the feedback control signal $V_C$ generated by the control unit is given by the following equation:

$$V_c = -K_{lin} \int w \, dt|_{S=X_S} + K_{non} \int w^{3} dt|_{S=X_S}.$$

5. A cantilever controlling method for a cantilever device used for an atomic force microscope which measures a surface geometry of a measuring object, in which the cantilever device comprises a cantilever equipped with a probe at a tip and capable of vibrating, a vibration source which realizes the cantilever to vibrate in a self-excited mode, a detection mechanism which detects a deflection angle of the cantilever, and a control unit which performs a feedback control of the vibration source based on the deflection angle of the cantilever; wherein
    the control unit controls the vibration source based on a feedback control signal $V_C$ given by the following equation:

$$V_c = -K_{lin} \int \frac{\partial w}{\partial s} dt \bigg|_{s=x_S} + K_{non} \int \left(\frac{\partial w}{\partial s}\right)^{m+1} dt \bigg|_{s=x_S}; \quad (5)$$

and wherein $K_{lin}$ is a linear feedback gain which is positive;
$K_{non}$ is a nonlinear feedback gain which is positive;
$\partial w/\partial s$ is the deflection angle of the cantilever;
$X_S$ is a sensing point for the cantilever; and
m is an even number equal to or larger than 2.

6. The cantilever controlling method according to claim 5, wherein the control unit controls the vibration source based on the feedback control signal $V_C$ given by the following equation:

$$V_c = -K_{lin} \int \frac{\partial w}{\partial s} dt \bigg|_{s=x_S} + K_{non} \int \left(\frac{\partial w}{\partial s}\right)^{3} dt \bigg|_{s=x_S}. \quad (6)$$

7. A cantilever controlling method for a cantilever device used for an atomic force microscope which measures a surface geometry of a measuring object, in which the cantilever device comprises a cantilever equipped with a probe at a tip and capable of vibrating, a vibration source which realizes the cantilever to vibrate in a self-excited mode, a detection mechanism which detects a deflection or a displacement of the cantilever, and a control unit which performs a feedback control of the vibration source based on the deflection or displacement of the cantilever; wherein the control unit controls the vibration source based on a feedback control signal $V_C$ given by the following equation:

$$V_c = -K_{lin} \int w \, dt \big|_{S=X_S} + K_{non} \int w^{m+1} dt \big|_{S=X_S};$$ and wherein $K_{lin}$ is a linear feedback gain which is positive;
$K_{non}$ is a nonlinear feedback gain which is positive;
w is the deflection or the displacement of the cantilever;
$X_S$ is a sensing point for the cantilever; and
m is an even number equal to or larger than 2.

8. The cantilever of a van der Pol type controlling method according to claim 7, wherein the control unit controls the vibration source based on the feedback control signal $V_C$ given by the following equation:

$$V_c = -K_{lin} \int w \, dt \big|_{S=X_S} + K_{non} \int w^3 dt \big|_{S=X_S}.$$

* * * * *